United States Patent [19]

Hamilton et al.

[11] Patent Number: 4,828,055
[45] Date of Patent: May 9, 1989

[54] WEIGHBRIDGE WITH PIVOTAL SUPPORTING SYSTEM

[75] Inventors: L. Joe Hamilton; James O. Coons, both of Knowles, Okla.

[73] Assignee: Linda L. Hester, Gate, Okla.

[21] Appl. No.: 169,315

[22] Filed: Mar. 17, 1988

[51] Int. Cl.$^4$ ............... G01G 19/02; G01G 21/28
[52] U.S. Cl. .................................. 177/134; 177/244
[58] Field of Search ..................... 177/134, 135, 244

[56] References Cited

U.S. PATENT DOCUMENTS

| | | | |
|---|---|---|---|
| 3,999,621 | 12/1976 | Wagner | 177/1 |
| 4,066,140 | 1/1978 | Conley | 177/134 |
| 4,134,467 | 1/1979 | Czyryk | 177/133 |
| 4,203,497 | 5/1980 | Harris et al. | 177/134 |
| 4,248,317 | 2/1981 | Rahav | 177/134 |
| 4,266,624 | 5/1981 | Dillon et al. | 177/253 |
| 4,280,576 | 7/1981 | Smith, Jr. | 177/126 |
| 4,281,728 | 8/1981 | Dickason et al. | 177/134 |
| 4,549,622 | 10/1985 | Leiman | 177/134 |
| 4,627,507 | 12/1986 | Powell et al. | 177/211 |

OTHER PUBLICATIONS

UniBridge Scale Systems Brochure entitled "Electronic Truck Scales".
UniBridge Scale Systems Brochure entitled "Electronic Low Profile Truck scales".

Primary Examiner—George H. Miller, Jr.
Attorney, Agent, or Firm—Laney, Dougherty, Hessin & Beavers

[57] ABSTRACT

A weightbridge with pivotal supporting system. The weightbridge may be of either electronic or mechanical measuring type. In an electronic weightbridge embodiment, the supporting system is also a connecting system for adjacent deck sections. One of the deck sections has pairs of spaced plates extending therefrom with a pin attached thereto. A load cell is mounted on a base below the plates. The pins on the plates are interconnected with ends of the load cell by a pair of links. Sleeves are positioned on the pins and are engaged by the links. An adjacent deck section has plates extending therefrom, each plate having a notch therein for pivotal engagement with the pins. The deck sections may be locked against pivotation if desired. In a mechanical weightbridge embodiment, a plate extends transversely from an end of a deck section and has a pin with opposite ends extending therefrom. A beam is pivotally mounted adjacent the deck section and has a support pin extending therefrom. A support member is pivotally mounted on the support pin and has a load pin extending therefrom. The load pin and the pin attached to the deck section are interconnected by a pair of spaced links. Sleeves are positioned on the ends of each of the pins and are engaged by the links.

28 Claims, 5 Drawing Sheets

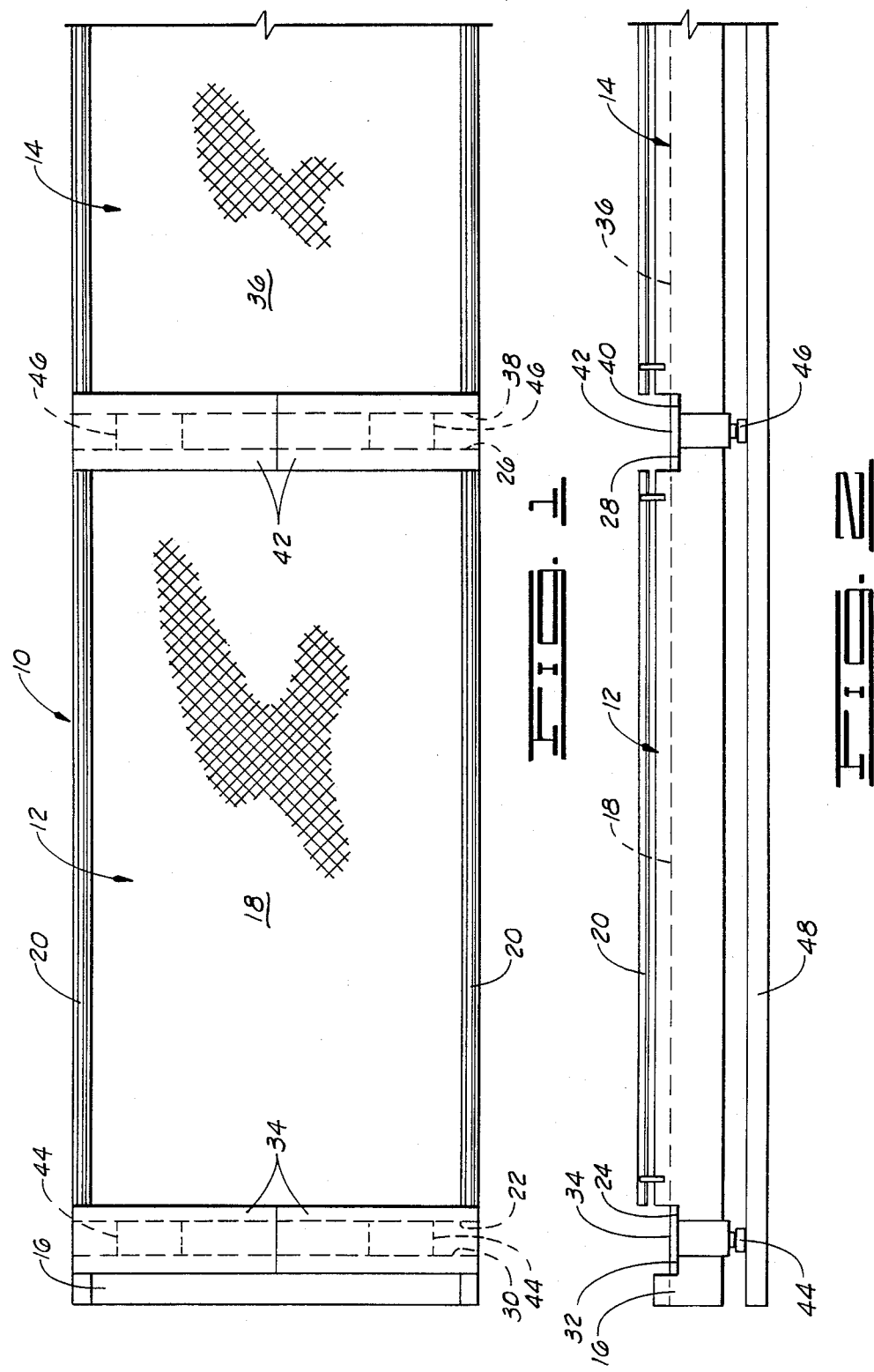

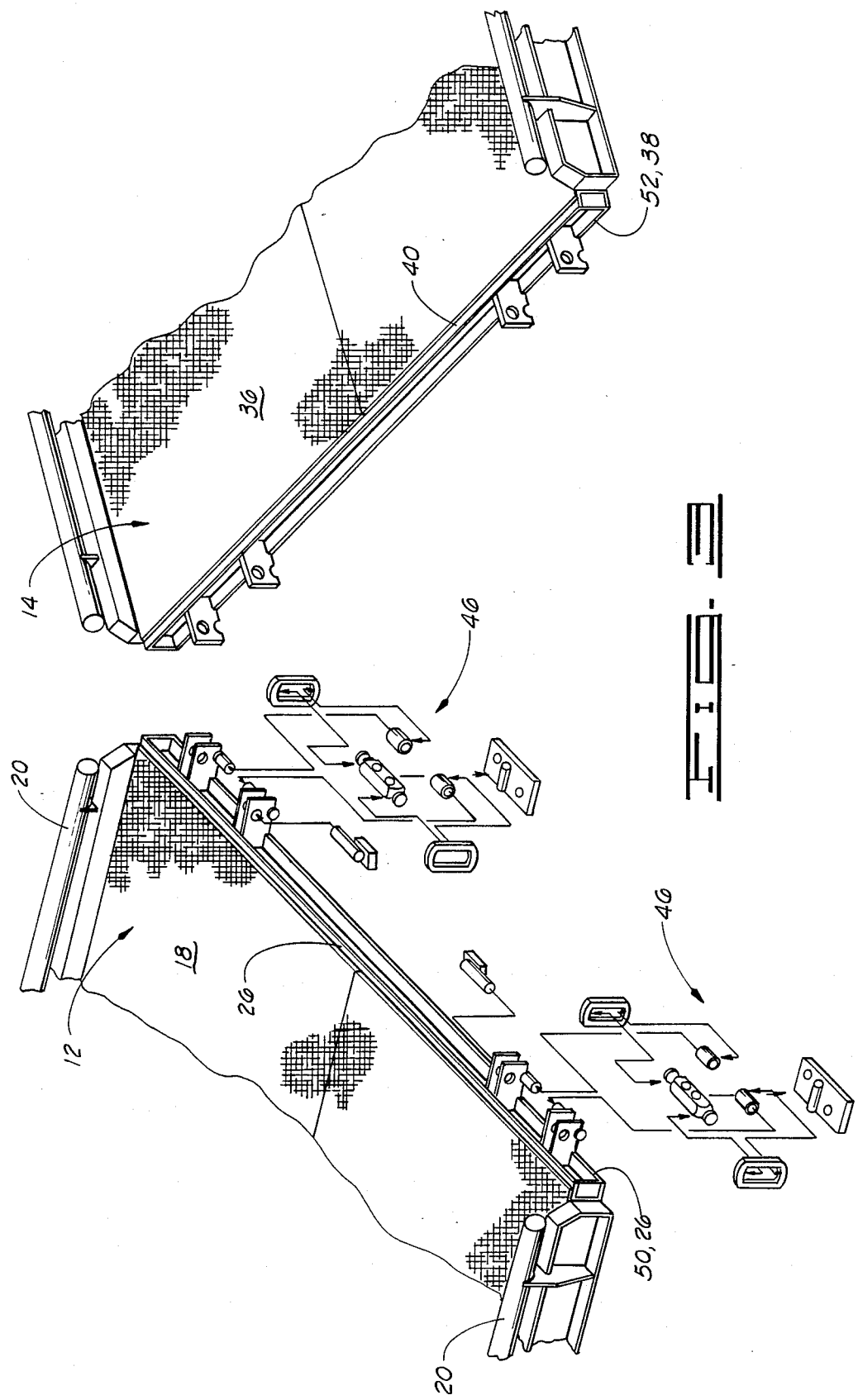

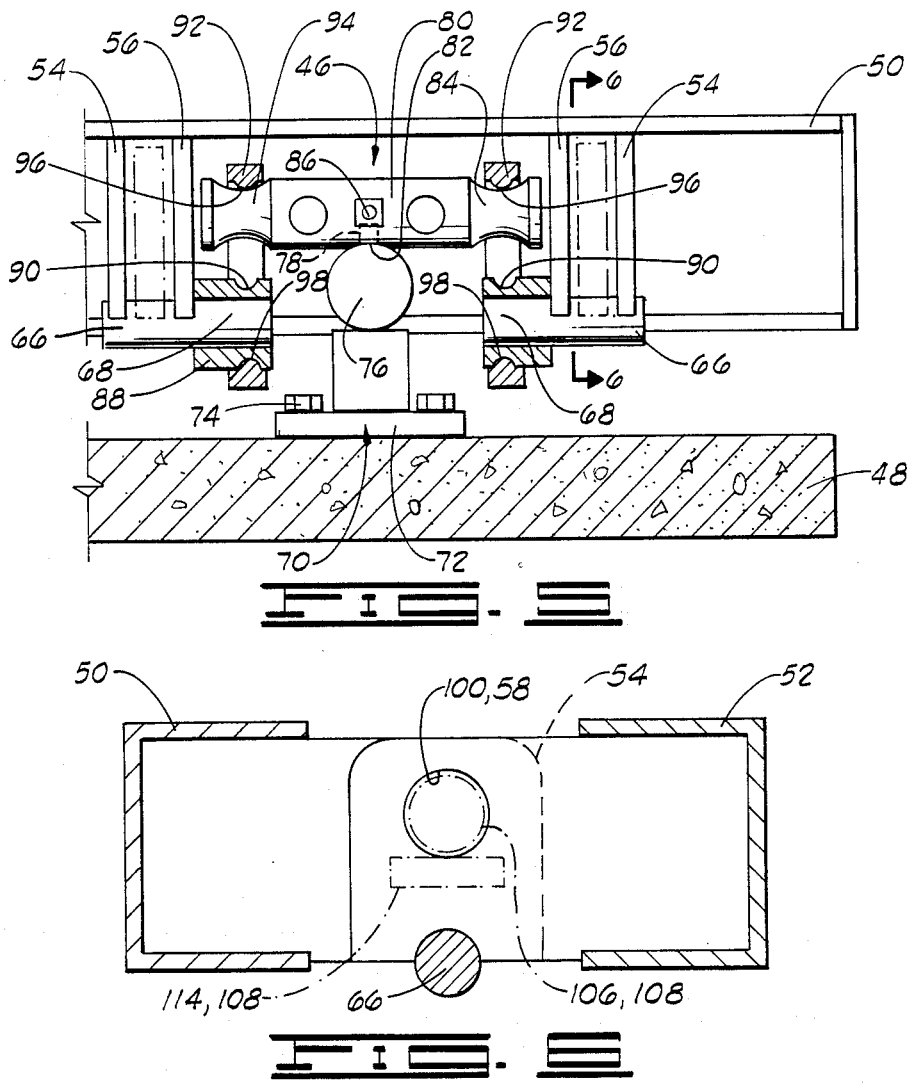

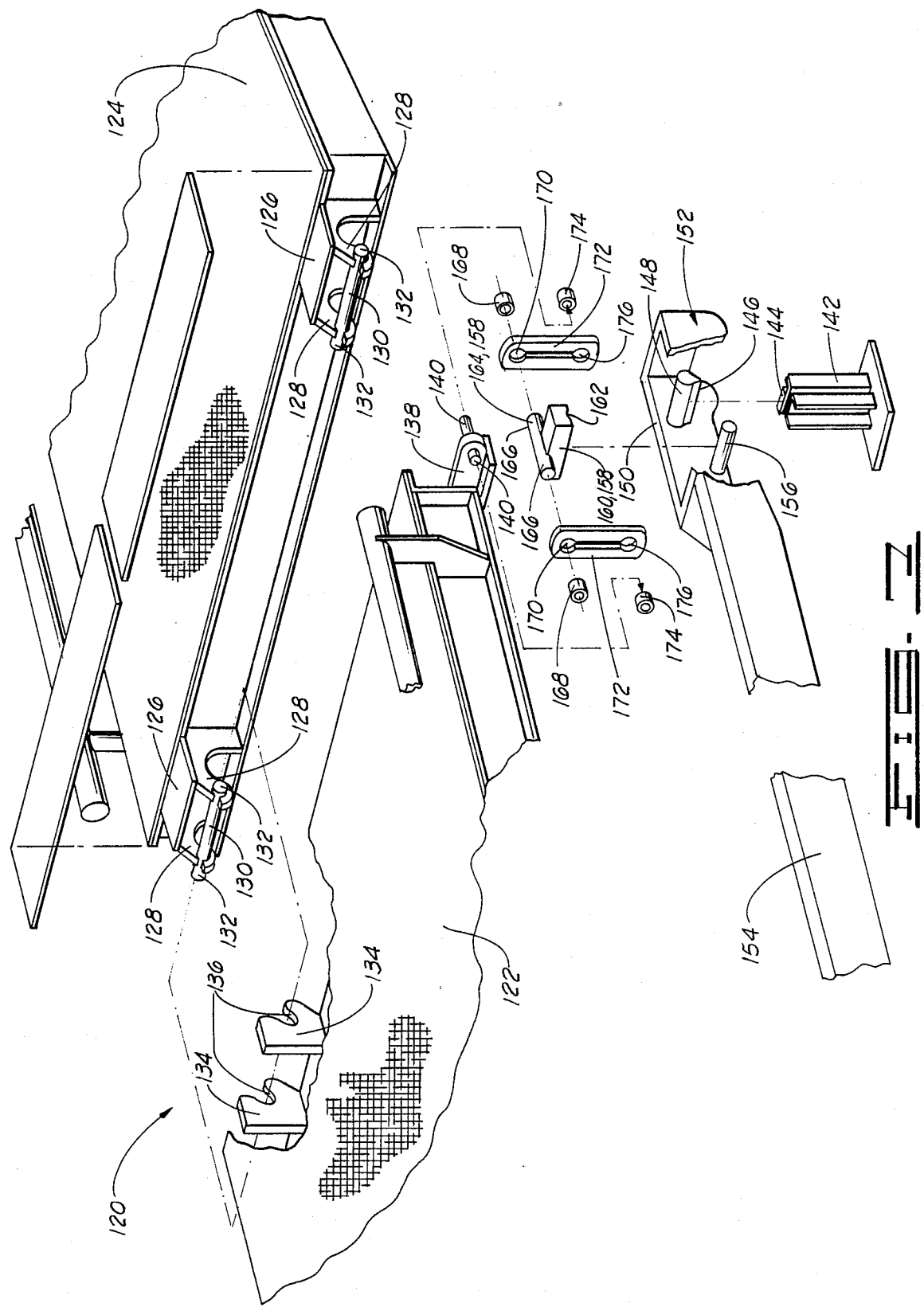

WEIGHBRIDGE WITH PIVOTAL SUPPORTING SYSTEM

BACKGROUND OF THE INVENTION

1. Field of the Invention

This invention relates to weighbridges for weighing large loads and supporting systems for such weighbridges, and more particularly, to a weighbridge having an easily assembled pivotal supporting system which also may be used as a connecting system for sections or portions of the weighbridge.

2. Description of the Prior Art

Weighbridges adapted for weighing large loads, such as trucks, are known in the art. Some weighbridges have electronic measuring means, and others use mechanical measuring means. One weighbridge or scale utilizing electronic transducers or load cells is manufactured by UniBridge Scale Systems of Knowles, Okla., and described in a UniBridge brochure entitled "Electronic Truck Scales". This prior electronic weighbridge may include a plurality of deck sections with each deck section interconnected by a pair of connecting modules. Each connecting module includes an electronic transducer supported on a base member having an opening therethrough. The transducer is positioned parallel to the sides of the deck sections, and a pin is disposed through the opening in the base member substantially parallel to the transducer and having ends which extend beyond the ends of the transducer. The pin is hung from the transducer by means of a pair of opposite links, each link supporting one end of the pin and hanging from an extended end of the transducer. A load-bearing saddle member is bolted to each of the deck portions and has opposite sides with downwardly facing grooves therein for engaging, and bearing upon, the opposite extended ends of the pin, such that a load from the deck portions is transmitted to the electronic transducer through the links. This apparatus has worked well, but the modules require significant time for assembly because the loadbearing members must be bolted to the deck sections. The present invention, which allows pivotal movement between adjacent deck sections on an electronic weighbridge and which requires no bolting to connect the deck sections, offers an improvement over this previously known weighbridge.

The heavy-duty weigh scale of Leiman, disclosed in U.S. Pat. No. 4,549,622, uses a double-ended, shear-beam-type transducer under longitudinally extending beams of the scale. The transducer has opposite fixed ends so that loading on the load cell is at the center thereof through a chair member and a suspension link. Bearing means on the link engages the center of the load cell, and the chair member pivotally rests on cylindrical bearing portions of the link. The chair member is bolted to the scale, in a manner similar to the UniBridge device, and further, the load cell itself is bolted in place and must have the link positioned therearound prior to this bolting. This apparatus is not particularly well suited for interconnecting deck sections of a weighbridge, and unlike the present invention, requires bolting for assembly.

U.S. Pat. No. 4,066,140 to Conley discloses a heavy-duty industrial scale with transducers positioned transversely with respect to longitudinal beams in the scale. As with the Leiman device, the transducer is affixed at its outer ends and has an upper link disposed terearound to bear against the center of the transducer with a bottom link extending downwardly from the upper link and integrally formed therewith. A cross pin rests on the bottom link and opposite legs of a mounting chair rest on outer ends of the cross pin. In an alternate embodiment, the transducer has a cantilevered end. This apparatus has the same limitations as Leiman in that the transducer must be bolted to a support member, and the chair must be attached to the scale. This device, like Leiman, also does not appear to be well adapted for interconnecting two deck sections of a weighbridge.

U.S. Pat. No. 4,627,507 to Powell et al. discloses a load cell fixture similar to that used in the Conley apparatus, but instead uses a pair of links positioned on opposite sides of the load cell with an upper pin resting on the load cell. The links hang from the upper pin and support the lower pin, upon which a mounting chair rests. This device has the same limitations as Leiman and Conley, except that it does not require the positioning of a link around the load cell prior to bolting the load cell to the support member.

As indicated, the present invention provides a supporting and connecting system for sections or portions of an electronic weighbridge. The system is easily assembled because no bolting is required, and further provides for pivotation between adjacent weighbridge sections, thus reducing fatigue and the relatively frequent repair required thereby. The present invention also provides a pivotal supporting system for a mechanical weighbridge which is quickly assembled with no bolting and operates under the same principles as on the electronic weighbridge. This pivotal support system also reduces possibilities of induced moments due to uneven loading. The pivotal support system eliminates uplifting reactions on one weighbridge section from an adjacent weighbridge section due to extreme, uneven loading. This, in turn, improves scale accuracy.

SUMMARY OF THE INVENTION

The pivotal supporting system of the present invention is adapted for supporting a weighbridge section and comprises pin means extending from the weighbridge section for providing a pair of load surfaces, load-supporting means adjacent the weighbridge section for supporting a load transmitted from at least a portion of the section and a pair of spaced links for interconnecting opposite ends of the load-supporting means with corresponding load surfaces of the pin means. Preferably, the apparatus further comprises plate means for extending from the weighbridge section, wherein, the pin means is attached to the plate means. The plate means may be characterized by at least one plate, the pin means may be characterized by at least one pin attached to at least one plate, and the load surfaces of the pin means may be characterized by ends of such a pin or by ends of a plurality of pins.

For an electronic weighbridge, the supporting system is also adapted for connecting two adjacent sections or portions of the weighbridge and may be said to comprise first plate means extending from one of the portions of the weighbridge toward the other of the portions, second plate means for extending from the other portion toward the one portion and for positioning adjacent the first plate means, load-measuring means disposed between the two portions of the weighbridge for measuring a load transmitted therefrom, and linking means for interconnecting at least one of the first and second plate means with the load-measuring means and for transmitting the load. The load-measuring means is substantially parallel adjacent ends of the two weighbridge portions.

In the electronic weighbridge embodiment, the first plate means comprises a pin thereon, and the second plate means defines a notch therein, whereby the second plate means is pivotally engageable with the pin. A sleeve is preferably rotatably mounted on the pin, and the linking means is adapted for pivotally engaging the sleeve. The first plate means may be characterized by a pair of spaced first plates, and the second plate means may be characterized by a second plate disposed between the spaced first plates and located thereby. The first plates define aligned holes therethrough, and the second plate defines a hole therethrough alignable with the holes in the first plate. Locking means may be provided for positioning through the holes in the first and second plates and thereby locking the two portions against mutual rotation.

For a mechanical weighbridge embodiment, the supporting system may be said to comprise a plate extending from the weighbridge section or portion to be supported, a pin attached to the plate and having opposite ends extending therefrom, supporting means positioned adjacent the weighbridge portion, and linking means for interconnecting the supporting means with the ends of the pin. In this embodiment, the apparatus preferably further comprises a beam pivotally disposed adjacent the weighbridge portion which has a support pin extending therefrom, wherein, the supporting means is characterized by a support member pivotally engaged with a support pin. The beam is in operative association with a mechanical weighing means of a kind known in the art.

In the mechanical weighbridge embodiment, the support member has a load pin portion having opposite ends extending therefrom, and the linking means may be characterized by a pair of links interconnecting the opposite ends of the load pin portion with the corresponding opposite ends of the pin on the plate attached to the weighbridge portion. A sleeve may be slidably disposed on each of the ends of the load pin portion and each of the ends of the pin on the plate attached to the weighbridge portion. The sleeves are pivotally engaged with a corresponding portion of the links.

An important object of the present invention is to provide a pivotal supporting system for a weighbridge.

Another object of the invention is to provide a supporting and connecting system for sections of a weighbridge.

It is a further object of the invention to provide linking means for interconnecting ends of a load-measuring means or load-supporting means with at least one section of a weighbridge.

It is still another object of the invention to provide a connecting means for sections or portions of a weighbridge which requires no bolting associated with the connecting means.

Additional objects and advantages of the invention will become apparent as the following detailed description of the preferred embodiment is read in conjunction with the drawings which illustrate such preferred embodiment.

BRIEF DESCRIPTION OF THE DRAWINGS

FIG. 1 shows a plan view of an electronic weighbridge with the connecting system of the present invention.

FIG. 2 is a side view of the weighbridge of FIG. 1.

FIG. 3 is an exploded view of the connecting system for connecting two bridge sections of an electronic weighbridge.

FIG. 5 shows an elevation of the electronic weighbridge connecting system.

FIG. 6 is a cross section taken along line 6—6 in FIG. 5.

FIG. 7 shows an exploded view of a mechanical weighbridge with the alternate supporting system of the present invention.

DESCRIPTION OF THE PREFERRED EMBODIMENT

Figure 4:
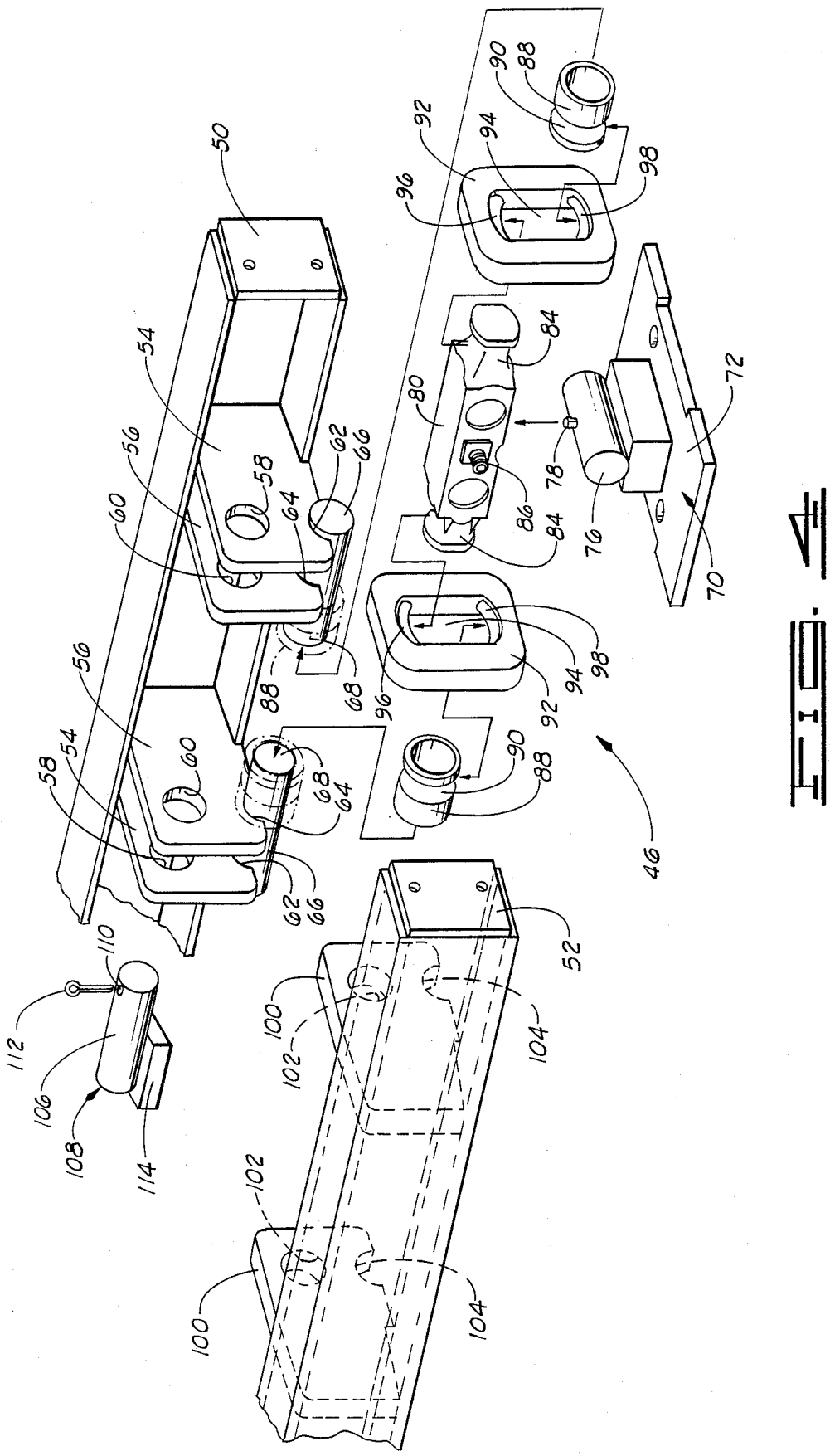
FIG. 4 is a detail exploded view of a portion of the connecting system in FIG. 3.

Referring now to the drawings, and more particularly to FIG. 1, an electronic weighbridge with the supporting and connecting system of the present invention is shown and generally designated by the numeral 10. Weighbridge 10 comprises a plurality of deck sections, such as 12 and 14, with an end cap 16 positioned at opposite ends of the weighbridge. Deck sections 12 and 14 are substantially identical, and any number of such sections may be used, depending upon the desired length of weighbridge 10.

Using deck sections 12 and 14 as representative deck sections, the general construction of any deck section will be discussed. Referring also to FIG. 2, deck section 12 has a substantially flat deck 18 with a pair of side rails 20 extending upwardly therefrom on opposite sides thereof. Deck section 12 has a first end 22 forming an upwardly facing lip 24 which is below the surface of deck 18. Similarly, deck section 12 has a second end 26 forming a second upwardly facing lip 28 which is below the surface of deck 18.

End cap 16 has a side 30 which generally faces first end 22 of deck section 12, and side 30 forms an upwardly facing lip 32 which is substantially aligned with lip 24 on deck section 12. A pair of cover plates 34 are positioned on lip 24 of deck section 12 and lip 32 of end cap 16 to cover the gap between first end 22 and side 30. The upper surfaces of cover plates 34 are aligned with the surface of deck 18.

Deck section 14 has a deck 36 substantially aligned with deck 18 of deck section 12. Deck section 14 also has an end 38 forming an upwardly facing lip 40. Second end 26 of deck section 12 and end 38 of deck section 14 are aligned and spaced apart as shown in FIGS. 1 and 2. A pair of cover plates 42 are positioned on lip 28 of deck section 12 and lip 40 of deck section 14 to cover the gap between the deck sections. The upper surfaces of cover plates 42 are substantially aligned with the surfaces of decks 18 and 36.

The joint between end cap 16 and deck section 12 is supported by a pair of latch modules or assemblies 44. Similarly, the joint between deck sections 12 and 14 is supported by a pair of latch modules or assemblies 46. The entire weighbridge 10 is thus supported by latch assemblies, such as 44 and 46, on a foundation 48 made of concrete or the like. Normally, foundation 48 is below grade so that decks 18 and 36 are substantially level with grade adjacent weighbridge 10.

Referring now to FIG. 3, details of the joint between deck sections 12 and 14, including latch assemblies 46, are shown. As will be further discussed herein, latch assemblies 44 are almost identical to latch assemblies 46, and the following discussion with regard to latch assembly 46 may be assumed to apply to latch assembly 44, except where specifically noted otherwise.

End 26 of deck assembly 12 comprises an elongated open-sided box member 50. Similarly, end 38 of deck section 14 comprises an elongated, open-sided box member 52. A portion of the upper sides of box members 50 and 52 form lips 26 and 40, respectively.

Referring also to FIG. 4, the details of latch assembly 46 will be discussed. Extending from box 50 is a first plate means, including pin means thereon, preferably characterized by two pairs of plates 54 and 56, although single plates could be used. Plates 54 and 56 are attached to box 50 by welding or other means known in the art. Extending through plates 54 and 56 are aligned holes 58 and 60, respectively. On the lower side of plates 54 and 56 are aligned notches 62 and 64, respectively.

The pin means may be characterized by a pin 66 which is positioned in each set of aligned notches 62 and 64 and attached to plates 54 and 56 such as by welding or the like such that the pin forms a portion of the first plate means. Each pin 66 has an elongated end 68, forming a bearing surface, which extends away from the plate 56 to which the pin is attached and toward the other plate 56.

Referring also to FIG. 5 which shows latch assembly 46 in an assembled position with respect to box 50, it will be seen that the latch assembly further comprises a base assembly 70 disposed between the two pairs of plates 54 and 56 and having a mounting plate 72 adapted for attachment to foundation 14 by bolts or the like. At the upper end of base assembly 70 is a cylindrical member 76 with a location pin 78 extending upwardly therefrom.

Load measuring means, such as an electronic transducer or load cell 80 may be positioned on base assembly 70 such that the load measuring means is substantially parallel to the ends of the adjacent deck sections. In the preferred embodiment, load cell 80 has a lower groove 82 therein adapted for receiving cylindrical member 76 of base assembly 70. Location pin 78 on cylindrical member 76 extends upwardly into a hole in load cell 80, thus providing for locating and holding the load cell in place during installation. Location pin 78 is provided as a convenience during installation, but it is not necessary for operation of the system. The invention is not intended to be limited to a base assembly 70 with a location pin 78.

Also in the preferred embodiment, load cell 80 is of a double-ended type and has a pair of opposite load-receiving ends 84. As best seen in FIG. 5, ends 84 have a grooved configuration. Load cell 80 is of a kind known in the art and has an electrical connection 86 adapted for connecting to a meter calibrated for displaying and/or recording the load applied to load-receiving ends 84.

A sleeve 88 is slidably disposed over extended end 68 of each of pins 66. Each sleeve 88 has a curved annular groove 94 therein which is preferably near an end of sleeve 88 furthest from plate 56 when the sleeve is in position on pin 66. It will be seen in FIG. 5, that each groove 90 is substantially aligned with a load-receiving end 84 of load cell 80.

A linking means is provided for interconnecting the load-receiving ends of load cell 80 with a corresponding sleeve 88, and thus provides interconnection between the load-measuring means and the pin means, in the form of two sets of pins 66, and plates 54 and 56 of the first plate means. In the preferred embodiment, the linking means is characterized by a link 92 defining an opening 94 therein. Disposed on opposite sides of opening 94 in each link 92 is an upper bearing surface 96 and a lower bearing surface 98. Referring again to FIG. 5, it will be seen that upper bearing portion 96 is adapted for engagement with a load-receiving end 84 of load cell 80. Lower bearing portion 98 is adapted for engagement with groove 90 on sleeve 88. Thus, it will be seen by those skilled in the art that upper bearing portion 96 forms a first portion of link 92 adapted for hanging from load-receiving end 84 of load cell 80, and lower bearing portion 98 forms a second portion of link 92 adapted for supporting sleeve 88 and thus also for supporting pin 66. It will also be seen by those skilled in the art that box 50 forming end 26 of deck portion 12 is thus fully supported by a pair of latch assemblies 46.

Box member 52 on deck section 14 has a second plate means extending therefrom, preferably characterized by two pairs of spaced plates 100, adapted for positioning adjacent the first plate means. In the preferred embodiment, each plate 100 is adapted to be positioned between a set of plates 54 and 56 extending from box member 50. Each plate 100 defines a hole 102 therethrough which, when plate 100 is positioned between plates 54 and 56, is aligned with holes 58 and 60. Each plate 100 further defines a curvilinear notch in the lower edge thereof which is adapted for hinging or pivotal engagement with the corresponding pin 66. It will be seen by those skilled in the art that when plates 100 on box member 52 are positioned between the corresponding plates 54 and 56 on box member 50, that box member 52, and thus a portion of deck section 14 is also supported by latch assembly 46. In this way, box member 52 with plates 100 may be described as a male portion, and box member 50 with plates 54 and 56 may be described as a female portion of latch assembly 46. It will be further seen that plates 100 are free to pivot as necessary on pins 66 to allow for uneven loading on weighbridge 10.

When desired, box members 50 and 52 may be locked against mutual pivotation by inserting a cylindrical portion 106 of a jacking pad 108 through the aligned set of holes 58, 102 and 60. An end of cylindrical portion 106 defines a transverse hole 110 therethrough adapted for receiving a cotter pin 112 for locking jacking pad 108 with respect to plates 58, 100 and 56. See also FIG. 6. It will be seen that even with jacking pad 108 locking box members 50 and 52 against mutual rotation, the joint between deck sections 12 and 14 is still supported by latch assembly 46.

Jacking pad 108 also has a pad portion 114 fixedly attached or integrally formed with cylindrical portion 106. By positioning a hydraulic jack of a kind known in the art (not shown) between pad portion 114 and foundation 48, box members 50 and 52 may be jacked upwardly. This will relieve the weight on load cell 80 such that the load cell or other components of latch assembly 46 may be replaced as necessary.

Referring again to FIGS. 1 and 2, latch assembly 44 interconnecting end cap 16 and deck section 12 is substantially identical to latch assembly 46. However, for use with end cap 16, jacking pad 108 is always locked in position through the aligned holes in the plates. Thus, end cap 16 will not pivot with respect to deck section 12.

Each of deck sections 12 and 14, and any others in weighbridge 10, will have a male end, such as box member 52 with plates 100 and a female end such as box member 50 with plates 54 and 56 so that each deck section is substantially identical and may be attached to any other deck section. Thus, any number of deck sections may be connected to form any desired length of weighbridge 10.

As illustrated herein, end cap 16 would have an end such as box member 52 with plates 100. That is, end cap 16 would be referred to as a male end cap. It will be seen by those skilled in the art that an end cap (not shown) on the opposite end of weighbridge 10 would be a female end cap having an end such as box member 50 with plates 54 and 56. Such a female end cap would always be locked against pivotation with the adjacent deck section by use of jacking pads 108 in a manner similar to end cap 16.

Referring now to FIG. 7, a mechanical weighbridge using an alternate embodiment of the present invention as a supporting system is shown and generally designated by the numeral 120. Weighbridge 120 includes a plurality of deck sections such as 122 and 124.

A pair of spaced brackets 126 are attached to an end of deck section 124 and extend therefrom. Each bracket 126 has a pair of support arms 128 to which a hinge pin 130 is fixedly attached such that opposite ends 132 of pin 130 extend outwardly from bracket 126. A pair of spaced pivot plates 134 extend from an end of deck section 122 facing deck section 124. Each pivot plate 134 defines a notch 136 therein adapted for pivotally receiving an end 32 of pin 130. When assembled, it will be seen by those skilled in the art that deck sections 122 and 124 are thus hingingly or pivotally connected together.

Extending transversely from each side of deck section 122 is a plate means, including pin means thereon, which may be characterized by a mounting arm or plate 138 having a longitudinally oriented mounting pin 140 extending in opposite directions thereon. The opposite ends of pin 140 form a bearing surface. Positioned adjacent mounting arm 138 and affixed to a foundation below weighbridge 120 is a mounting base 142. An upper end 144 of mounting base 142 is adapted for receiving a downwardly extending knife edge 146 on a pivot pin 148 extending transversely in a boxlike end 150 of a measuring beam 152. Beam 152 extends parallel to deck section 122 and has an extended end 154 adapted for engaging a mechanical measuring means in a manner known in the art. Also extending transversely in end 150 of beam 152 is a support pin 156 which is spaced longitudinally from pivot pin 148 and preferably spaced downwardly therefrom as well.

A support member 158 has a lower block portion 160 with a downwardly facing groove 162 therein adapted for pivotal engagement with support pin 156. Fixedly attached or integrally formed with block portion 160 is a load pin 164 of support member 158. Load pin 164 forms two extensions 166 on opposite sides of lock portion 160.

An upper sleeve 168 is slidably disposed on each extension 166. Each upper sleeve 168 is pivotally disposed in upper opening 170 of a link 172.

A lower sleeve 174 is slidably positioned on each mounting pin 140 and pivotally disposed in lower opening 176 of the corresponding link 172. When fully assembled, mounting arm 138 is below support pin 156, and it will be seen by those skilled in the art that support pin 156 and thus mounting arm 138 are hung from load pin 164 by links 172. It will also be seen that this provides a mounting system with linking means which is a variation on latch assembly 46 with load pin 164 replacing electronic load cell 80. Thus, mechanical weighbridge 120 has a supporting system similar to the connecting system of electronic weighbridge 10. Also, mechanical weighbridge 120 is easily assembled with no bolting as is electronic weighbridge 10.

It will be seen, therefore, that the weighbridge with supporting and connecting system of the present invention is well adapted to carry out the ends and advantages mentioned as well as those inherent therein. While presently preferred embodiments of the invention have been shown for the purposes of this disclosure, numerous changes in the arrangement and construction of parts may be made by those skilled in the art. All such changes are encompassed within the scope and spirit of the appended claims.

What is claimed is:

1. An apparatus for supporting a pair of weighbridge sections, said apparatus comprising:
   pin means extending from one of said sections for providing a pair of load surfaces and adapted for pivotal engagement by the other of said sections;
   load-supporting means adjacent said one section for supporting a load transmitted from at least a portion of said one section; and
   a pair of spaced links for interconnecting opposite ends of said load-supporting means with corresponding load surfaces of said pin means.

2. The apparatus of claim 1 further comprising plate means for extending from said one section;
   wherein, said pin means is attached to said plate means.

3. The apparatus of claim 2 wherein:
   said plate means is characterized by at least a pair of said plates;
   said pin means is characterized by a pin attached to at least one of said plates with an end extending therefrom; and
   said load surfaces of said pin means are characterized by the ends of said pins.

4. Th apparatus of claim 3 wherein said load-supporting means comprises electronic load-measuring means for measuring said load.

5. The apparatus of claim 4 wherein said load-measuring means comprises a load cell.

6. The apparatus of claim 2 wherein:
   said pin means is characterized by a pin attached to said plate means with opposite ends extending therefrom; and
   said load surfaces of said pin means are characterized by said ends of said pin.

7. An apparatus for supporting a weighbridge section, said apparatus comprising:
   plate means for extending from said section;
   pin means extending from said section for providing a pair of load surfaces, said pin means being characterized by a pin attached to said plate means with opposite ends extending therefrom, said load surfaces of said pin means being characterized by said ends of said pin;
   load-supporting means adjacent said section for supporting a load transmitted from at least a portion of said section;
   a pair of spaced links for interconnecting opposite ends of said load-supporting means with corresponding load surfaces of said pin means; and a beam pivotally mounted adjacent said section and having a support pin extending thereform and adapted for supporting engagement with said load-supporting means.

8. The apparatus of claim 7 wherein said load-supporting means is characterized by a support member comprising:
a lower portion adapted for pivotal engagement with said support pin; and
an upper portion having said opposite ends thereon.

9. An apparatus for connecting two portions of a weighbridge, said apparatus comprising:
first plate means for extending from one of said portions toward the other of said portions;
second plate means for extending from said other portion toward said one portion and for positioning adjacent said first plate means;
load-measuring means disposed between said two portions of said weighbridge for measuring a load transmitted therefrom; and
linking means for interconnecting at least one of said first and second plate means with said load-measuring means and for transmitting said load.

10. The apparatus of claim 9 wherein said load-measuring means is substantially parallel to adjacent ends of said two weighbridge portions.

11. The apparatus of claim 9 wherein:
said first plate means comprises a pin thereon; and
said second plate means defines a notch therein, whereby said second plate means is pivotally engageable with said pin.

12. The apparatus of claim 11 further comprising a sleeve rotatably mounted on said pin; and
wherein said linking means is adapted for pivotally engaging said sleeve.

13. The apparatus of claim 9 further comprising support means for supporting said load-measuring means above a support surface.

14. An apparatus for connecting two portions of a weightbridge, said apparatus comprising:
first plate means for extending from one of said portions toward the other of said portions, said first plate means comprising a pair of spaced first plates;
second plate means for extending from said other portion toward said one poriton and for positioning adjacent said first plate means, said second plate means comprising a second plate disposed between said spaced first plates and located thereby;
laod-measuring means disposed between said two portions of said weighbridge for measuring a load transmitted therefrom; and
linking means for interconnecting at least one of said first and second plate means with said load-measuring means and for transmitting said load.

15. The apparatus of claim 14 wherein:
said first plates define aligned holes therethrough;
said second plate defines a hole therethrough alignable with said holes in said first plate; and
further comprising locking means for positioning through said holes in said first and second plates and thereby locking said two portions against mutual rotation.

16. A weighbridge for use on a support surface comprising:
a first deck portion having a substantially vertically disposed plate extending therefrom, said plate having a substantially horizontal pin thereto;
a second deck portion having a substantially vertically disposed plate extending therefrom, said plate on said second deck portion defining a notch therein and being positionable adjacent said plate on said first deck portion such that said
a load cell positioned between said first and second deck portions and having a load-receiving end;
a base for supporting said load cell on said support surface; and
a link comprising:
a first portion adapted for hanging from said ends of said load cell; and
a second portion adapted for supporting said pin;
whereby a load from said first and second deck portions is applied to said load cell.

17. The apparatus of claim 16 further comprising a sleeve positioned on said plate such that said sleeve is in engagement with said second portion of said link.

18. The apparatus of claim 17 wherein:
said sleeve defines an annular groove thereon; and
said second portion of said link is further adapted for fitting in a portion of said groove.

19. The apparatus of claim 16 wherein:
said first deck portion has another substantially vertically disposed plate extending therefrom spaced from the first mentioned plate; and
said plate on said second deck portion is positionable between the plates on said first deck portion.

20. The apparatus of claim 16 wherein:
said link defines an opening therein; and
said first and second portions of said link are characterized by bearing members disposed on opposite sides of said opening.

21. The apparatus of claim 16 wherein:
each of said plates defines a hole therethrough, said holes being alignable; and
further comprising a locking member disposed through the aligned holes whereby pivotation between said first and second deck portions is prevented.

22. The apparatus of claim 16 wherein one of said first and second deck portions is characterized as an end cap of said weighbridge.

23. The apparatus of claim 16 wherein:
said first deck portion has a second substantially vertically disposed plate extending therefrom having a second substantially horizontal pin attached thereto;
said second deck portion has a second substantially vertically disposed plate extending therefrom, said second plate on said second deck portion defining a notch therein and being positionable adjacent said second plate on said first deck portion such that said notch in said second plate on said second deck portion pivotally engages said second pin;
said load cell has a second load-receiving end opposite the first mentioned end thereof; and
further comprising a second link substantially identical to the first mentioned link for hanging from said second end of said load cell and for supporting said second pin.

24. An apparatus for supporting at least a portion of an end of a weighbridge, said apparatus comprising:
a plate extending from said weighbridge portion;
a pin attached to said plate and having opposite ends extending therefrom;
supporting means positioned adjacent said weighbridge portion; and linking means for interconnecting said supporting means with said ends of said pin.

25. An apparatus for supporting at least a portion of an end of a weighbridge, said apparatus comprising:
 a plate extending from said weighbridge portion;
 a pin attached to said plate and having opposite ends extending therefrom;
 a beam pivotally disposed adjacent said weighbridge portion and having a support pin extending therefrom;
 supporting means positioned adjacent said weightbridge portion, said supporting means being characterized by a support member pivotally engaged with said support pin; and
 linking means for interconnecting said supporting means with said ends of said first-mentioned pin.

26. The apparatus of claim 25 wherein:
 said support member has a load pin portion having opposite ends extending therefrom; and
 said linking means is characterized by a pair of links interconnecting said opposite ends of said load pin portion with corresponding opposite ends of said pin on said plate attached to said weighbridge portion.

27. The apparatus of claim 26 further comprising a sleeve slidably disposed on each of said ends of said load pin portion and said ends of said pin on said plate attached to said weighbridge portion, said sleeves being pivotally engaged with the corresponding portion of said links.

28. The apparatus of claim 25 further comprising:
 a pivot pin extending from said beam; and
 a mounting base disposed below said beam and adapted for pivotal engagement by said pivot pin.

* * * * *

UNITED STATES PATENT AND TRADEMARK OFFICE
CERTIFICATE OF CORRECTION

PATENT NO. : 4,828,055
DATED : May 9, 1989
INVENTOR(S) : L. Joe Hamilton and James O. Coons It is certified that error appears in the above-identified patent and that said Letters Patent is hereby corrected as shown below:

Abstract, lines 1, 2, 3 and 15, delete "weightbridge" and insert --weighbridge-- therefor.
Column 1, line 40, delete "loadb" and insert --load-- therefor; line 67, delete "terearound" and insert --therearound- therefor.
Claim 4, line 1, delete "Th" and insert --The-- therefor.
Claim 7, line 17, delete "thereform" and insert --therefrom-- therefor.
Claim 14, line 2, delete "weightbridge" and insert --weighbridge-- therefor; line 7, delete "poriton" and insert --portion -- therefor; line 11, delete "laod" and insert --load-- therefor.
Claim 16, line 5, after "pin" and before "thereto", insert --attached--; line 10, insert --notch pivotally engages said pin --, after "said --.
Claim 25, line 9, delete "weight-" and insert --weigh- -- therefor.

Signed and Sealed this

Tenth Day of October, 1989

Attest:

DONALD J. QUIGG

Attesting Officer

Commissioner of Patents and Trademarks